Dec. 1, 1936.  D. F. CASHMAN  2,062,293
PROPELLER DRIVE
Filed May 22, 1935

Inventor
Denis F Cashman
Walker & Brybvig
Attorney

Patented Dec. 1, 1936

2,062,293

UNITED STATES PATENT OFFICE 2,062,293

PROPELLER DRIVE

Denis F. Cashman, Dayton, Ohio

Application May 22, 1935, Serial No. 22,842

10 Claims. (Cl. 170—165)

(Granted under the act of March 3, 1883, as amended April 30, 1928; 370 O. G. 757)

This invention relates to aircraft and particularly to the drive mechanism for driving concentrically mounted propellers at equal speeds but in opposite directions from a common drive shaft.

An object of the invention is to drive a pair of propellers concentrically mounted at equal speeds or substantially so but in opposite directions. This is accomplished by a suitable gear mechanism driving one propeller in one direction and the other propeller in the opposite direction.

A further object of this invention is to provide a pair of speed reducing mechanisms driven from a common shaft for rotating a pair of concentrically mounted propellers at equal speeds but in opposite directions.

Another object of this invention is to provide a gear mechanism for driving propellers that is detachably adaptable and removably mounted.

Another object of this invention is to provide a removably mounted support for a shaft driving a gear mechanism.

Another object of this invention is to provide a speed changing drive for a pair of concentrically mounted propellers driven from a common drive shaft driving the propellers in opposite directions, that is cheap, dependable, efficient and easily repaired.

With the above primary and other incidental objects in view, as will more fully appear in the specification, the invention consists of the features of construction, the parts and combinations thereof, and the mode of operation, or their equivalents, as hereinafter described and set forth in the claims.

Figure 1:
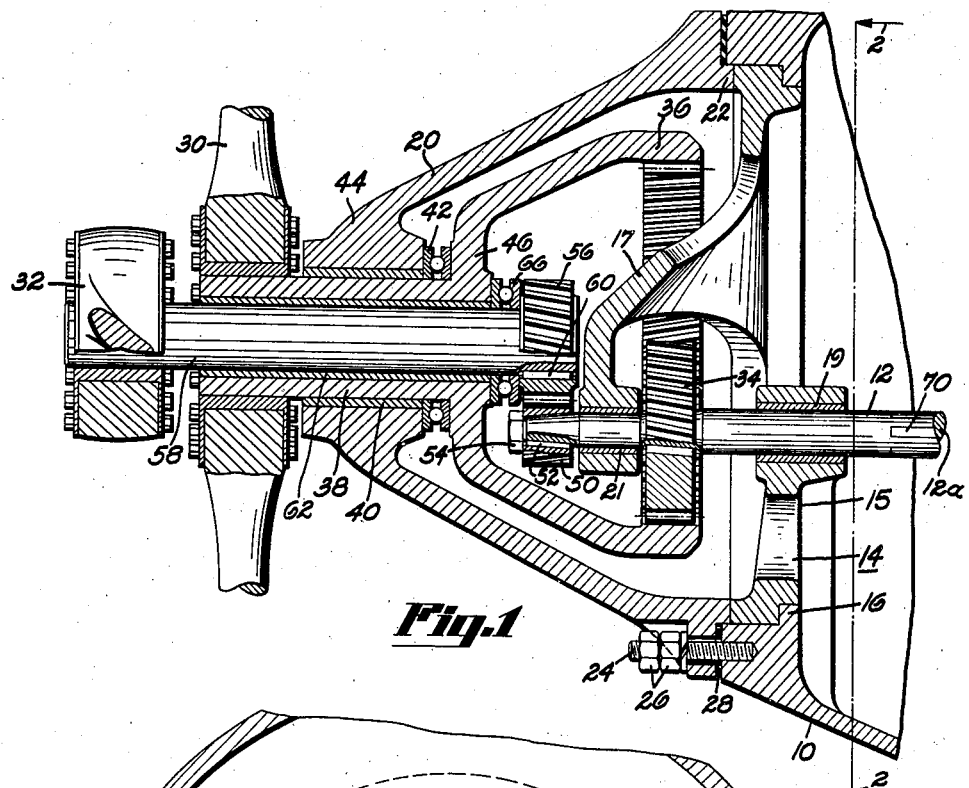

In the drawing, Fig. 1 shows a sectional view of my invention.

Figure 2:
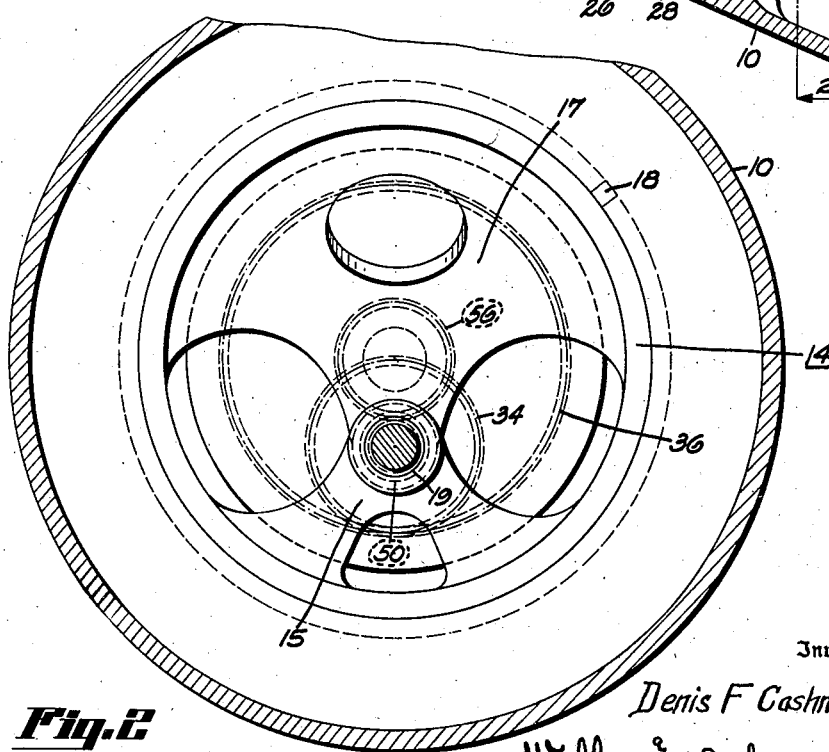

Fig. 2 shows a sectional view taken substantially on the line 2—2 of Fig. 1.

It has been found that a single propeller on an airplane, hydroplane or aircraft lighter than air, produces a rotating torque that tends to rotate the aircraft in a direction opposite to that of rotation of the propeller. This is found very hazardous, especially in hydroplanes, when taking off, as the propeller tends to rotate the hydroplane causing one of the pontoons to dip into the water thereby upsetting the plane. This has been overcome by the use of a pair of concentrically mounted propellers rotating at equal speeds but in opposite directions so that the torque produced by one propeller is made equal in any suitable well known manner and opposite to the torque produced by the other. By my device it is possible to drive both the propellers at equal speeds but in opposite direction from the common drive shaft through the use of external and internal meshing gears driving the propellers.

Referring to the drawing, like parts are indicated by similar characters of reference throughout the several views.

The reference character 10 indicates a motor casing, only a portion of which is shown as the motor per se does not constitute the invention. This casing 10 may be the crank case of an internal combustion engine. A drive shaft 12, which may be the crank shaft of the motor, is journaled in a removably mounted spider 14 supported in the end of the casing 10. This spider is preferably round and abuts the flange 16 projecting inwardly from the casing 10. In order to prevent rotation of the spider with respect to the casing, the spider is provided with a tooth 18 seated in a suitable recess in the flange 16. The spider 14 has a pair of arms 15 and 17 arranged to support a pair of spaced bearings 19 and 21 surrounding the shaft 12. A gear casing 20, conical in shape, the axis of which is offset with respect to the crank or drive shaft 12, is provided with a flange 22 abutting the spider 14 and clamping the same in position. This casing or housing 20 is attached to the motor casing 10 by a plurality of threaded studs 24 each provided with a pair of lock nuts 26. A suitable gasket 28 is preferably mounted between the housing 20 and the casing 10 to seal the union between the same. This permits the gear mechanism, to be described later, to be lubricated from the oil splashed from the cranks in the crank case of the motor if found desirable. A pair of propellers 30 and 32 are suitably mounted near the apex of the conical housing 20 and are driven in opposite directions by a drive mechanism which will now be described.

*Internal gear drive mechanism*

The propeller 30 is driven from the drive shaft 12 through an internal gear mechanism which includes the pinion 34 meshing with an internal gear 36 which includes a conical portion and terminates in a tubular sleeve 38 journaled in the housing 20. A suitable bearing 40 is preferably mounted intermediate the casing 20 and the tubular sleeve 38. An end thrust bearing 42 is mounted between the neck 44 of the housing 20 and the radial portion 46 of the internally toothed gear 36. The propeller 30 is suitably attached to the tubular sleeve 38 so that as the drive shaft 12 rotates the pinion 34 meshes with the internally toothed gear 36 thereby driving the tubular sleeve 38 and with it the propeller 30.

*Externally meshing gear mechanism*

The propeller 32 is driven from the shaft 12 through an externally meshing gear mechanism which includes the pinion 50 keyed upon the shaft 12 by the key 52 and held in position by a nut 54 threadedly engaging the end of the shaft 12. The pinion 50 meshes with a gear 56 keyed to a shaft 58 by a key 60. The shaft 58 is journaled in the tubular sleeve 38 which is preferably provided with a bearing 62. The propeller 32 is drivingly connected to the shaft 58 so that the shaft 12 when rotating drives the propeller 32 through the pinion 50 meshing with the pinion 56 keyed to the shaft 58. It is to be noted that the shaft 58 rotates in a direction opposite to the direction of rotation of the shaft 12. The end thrust bearing 66 is mounted intermediate the pinion 56 and the radial flange 46 so that the end thrust caused by the propeller 32 is transmitted to the neck 44 of the casing 20 through the end thrust bearing 66, the radial flange 46 and the other end thrust bearing 42.

Either helical or herring bone gears may be used. Helical gears have been shown in the drawing. It is to be noted that the teeth on the pinions 34 and 50 are inclined in opposite directions so that the end thrust caused by the meshing of one set of gears is counteracted by the end thrust caused by the other set of gears.

The housing 20 may be removed with the propellers 30 and 32 and the gears 36 and 56. The spider 14 is not removable until the nut 54 is removed together with the pinion 50. This pinion is mounted upon a tapered portion of the shaft 12 so as to facilitate easy removal. As the arm 15 is also integral with the spider 14 it is necessary to remove the gear 34 normally keyed upon a tapering portion of the shaft 12 by a key 35. Thus it is seen that the gear mechanism may be removed and placed into position without difficulty.

In the example shown in the drawing, the revolutions per minute of the drive shaft 12 is approximately twice the revolutions of each propeller which rotates at the same speed in that the follower gears 36 and 56 are twice the diameters of their driver gears 34 and 50, respectively. This ratio has been shown merely for the purpose of illustration.

In view of the outward end thrust exerted by the propellers 30 and 32 upon the shaft 58 and the tubular sleeve 38, respectively, a splined joint 70 is preferably used in the shaft 12 so as to prevent the transmission of the end thrust caused by the propellers to the crank shaft 12a. This end thrust is absorbed by the spline or joint in the shaft.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

This application is filed under the provisions of the act of April 30, 1928. The invention described herein may be manufactured and used by or for the Government for governmental purposes, without payment to me of any royalty thereon.

Having thus described my invention, I claim:

1. A device for driving a pair of concentrically mounted aircraft propellers at the same speed but in opposite directions from a drive shaft mounted in the motor casing, including a hollow conical housing removably attached to said motor casing, an internally driven gear mechanism for driving one of the propellers from the drive shaft in the same direction as the rotation of the drive shaft, said gear mechanism including a tubular sleeve journaled in said housing, said sleeve terminating in a hollow conical portion nestled in the hollow conical housing and internally toothed gear portion and a second gear mechanism for driving the other propeller from said drive shaft in a direction opposite from that of the first propeller, said second gear mechanism including a shaft journaled in said tubular sleeve, said shaft supporting an externally toothed gear mounted within the hollow conical portion of the internally toothed gear and meshing with a gear driven from said drive shaft.

2. A device for driving a pair of concentrically mounted aircraft propellers at the same speed but in opposite directions from a common drive shaft, said device including a hollow conical housing removably mounted to the motor housing, an internally driven gear mechanism mounted in said housing for driving one of the propellers from the drive shaft, said gear mechanism including a tubular sleeve journaled in said housing, said sleeve terminating in a hollow conical portion nestled in the hollow conical housing and internally toothed gear portion and a second gear mechanism for driving the other propeller from said drive shaft in the direction opposite to that of the first propeller, said second gear mechanism including a shaft journaled in said tubular sleeve, said shaft supporting an externally toothed gear mounted within the hollow conical portion of the internally toothed gear and meshing with a pinion mounted upon the drive shaft.

3. A device for driving a pair of concentrically mounted aircraft propellers at the same speed but in opposite directions from a common drive shaft, including a hollow conical housing removably mounted intercommunicating with the motor casing for said gear mechanism, an internally driven gear mechanism for driving one of the propellers from the drive shaft, said gear mechanism including a tubular sleeve journaled in said housing for transmitting power from the gear to the propeller, said sleeve terminating in a conical portion nestled within the hollow conical housing and a second gear mechanism for driving the other propeller from said drive shaft in the direction opposite from that of the first propeller, said second gear mechanism including a shaft journaled in said tubular sleeve, said shaft supporting a gear meshing with a gear driven from said drive shaft.

4. A speed reducing device for driving a pair of concentrically mounted aircraft propellers at the same speed but in opposite directions from a common drive shaft including a gear mechanism, a removably mounted hollow conical housing for said gear mechanism, a support, an internally driven gear mechanism mounted upon said support for driving one of the propellers from the drive shaft in the same direction as the drive shaft, said gear mechanism including a tubular sleeve journaled in said support, said tubular sleeve terminating in a conical gear portion nestled within the housing and a second gear mechanism for driving the other propeller from said drive shaft in the direction opposite to that of the first propeller, said second gear mechanism including a shaft journaled in said tubular sleeve.

5. A device for driving a pair of concentrically mounted aircraft propellers at the same speed but in opposite directions from a common drive shaft including a gear mechanism, a removably mounted hollow conical housing for said gear mechanism, a support, an internally driven gear mechanism for driving one of the propellers from the drive shaft in the same direction as the rotation of the drive shaft, said gear mechanism including a tubular sleeve in said support, said tubular sleeve terminating in a conical shaped portion nestled within the housing, said portion terminating in an internally toothed gear and a second gear mechanism for driving the other propeller from said drive shaft in an opposite direction from that of the first propeller, said second gear mechanism including a shaft journaled in said tubular sleeve.

6. A device for driving a pair of concentrically mounted aircraft propellers at the same speed but in opposite directions from a drive shaft mounted in the motor casing, including a hollow conical shaped housing removably attached to said motor casing, an internally driven gear mechanism for driving one of the propellers from the drive shaft in the same direction as the rotation of the drive shaft, said gear mechanism including a tubular sleeve journaled in said housing and a gear fixedly attached through a conical portion to one end of the sleeve, an endthrust bearing mounted intermediate said conical portion and said support for absorbing the endthrust on the sleeve caused by the propeller and a second gear mechanism for driving the other propeller from said drive shaft in the opposite direction from that of the first propeller, said second gear mechanism including a shaft journaled in said tubular sleeve.

7. A device for driving a pair of concentrically mounted aircraft propellers at the same speed but in opposite directions from a drive shaft mounted in a motor casing, including an inclosed support removably attached to said casing, said support having a hollow conical cavity, an internally driven gear mechanism for driving one of the propellers from the drive shaft in the same direction as the rotation of said shaft, said gear mechanism including a tubular sleeve journaled in said support, said sleeve terminating in a conical portion supporting a gear, an end thrust bearing mounted in said gear and said support for absorbing the end thrust of the propeller, and a second gear mechanism for driving the other propeller from said drive shaft in the direction opposite that of the first propeller, said second gear mechanism including a shaft journaled in said tubular sleeve, an end thrust bearing upon said last mentioned shaft intermediate the gears thereon and a gear carried by said tubular sleeve for transmitting the end thrust of the second propeller to said support.

8. A device for driving a pair of concentrically mounted aircraft propellers at the same speed but in opposite direction from a common drive shaft, mounted in a motor casing including a hollow conical shaped enclosed support assembly attached to said motor casing, an internally driven gear mechanism for driving one of the propellers from the drive shaft in the same direction as the rotation of the drive shaft, said gear mechanism including a tubular sleeve journaled in said support, a conical shaped portion upon said sleeve, said conical shaped portion being nestled within the support, an endthrust bearing mounted intermediate said abutment and said support for absorbing the endthrust of the propeller, a second gear mechanism for driving the other propeller from said drive shaft in the direction opposite to that of the first propeller, said second gear mechanism including a shaft journaled in said tubular sleeve, said shaft supporting said second propeller, an abutment upon said shaft oppositely disposed with respect to the propeller, an endthrust bearing abutting the abutment for transmitting the endthrust caused by the propeller to said support.

9. A device for driving a pair of concentrically mounted aircraft propellers rotating at the same speed but in opposite directions and driven from a common drive shaft mounted in the motor casing, said device including a housing removably attached to said motor casing, a spider mounted in said housing, said spider including one portion supporting a bearing in which the motor drive shaft is journaled and a second portion offset with respect to said first portion, said second portion having a bearing engaging the drive shaft near its end, an internally driven gear mechanism for driving said drive shaft, said gear mechanism including a pinion mounted upon the drive shaft intermediate said portions of the spider, a second gear mechanism for driving the other propeller, said second gear mechanism including a pinion mounted at the end of the drive shaft.

10. A speed reducing mechanism for driving a pair of propellers in opposite directions from a common drive shaft, including a speed reducing gear device having a driven gear and a driving gear for rotating one propeller in the same direction as the rotation of the drive shaft fixedly carrying one of said gears, the gear teeth of said gears being inclined in one direction, and a second speed reducing gear device having a driven gear and a driving gear for rotating the other propeller at the same speed but in an opposite direction, the teeth of the gears of the second speed reducing device being inclined similar to the teeth of the first device but in opposite direction so that the endthrust caused by the inclined gear teeth of one device is substantially neutralized by that of the other.

DENIS F. CASHMAN.